Figure 1:
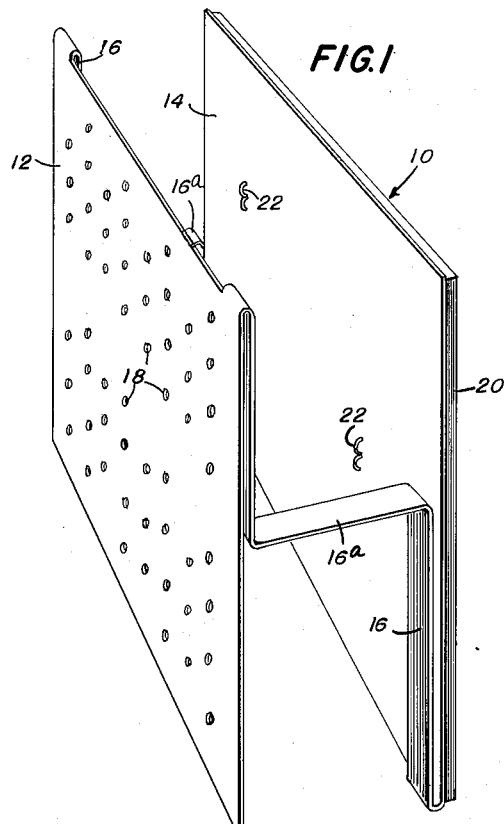

June 20, 1961 P. G. McKINLEY 2,988,854
WOODEN JOINT COUPLING INCLUDING NAIL CLINCHING MEANS
Filed April 7, 1958 3 Sheets-Sheet 1

INVENTOR
PAUL G. McKINLEY
BY Beale & Jones
ATTORNEYS

June 20, 1961 P. G. McKINLEY 2,988,854
WOODEN JOINT COUPLING INCLUDING NAIL CLINCHING MEANS
Filed April 7, 1958 3 Sheets-Sheet 2
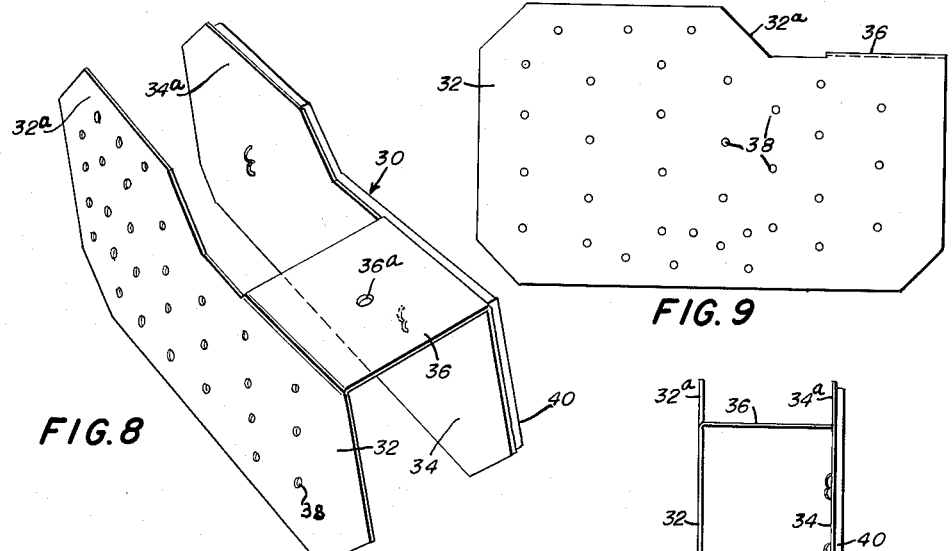
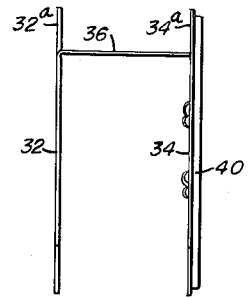
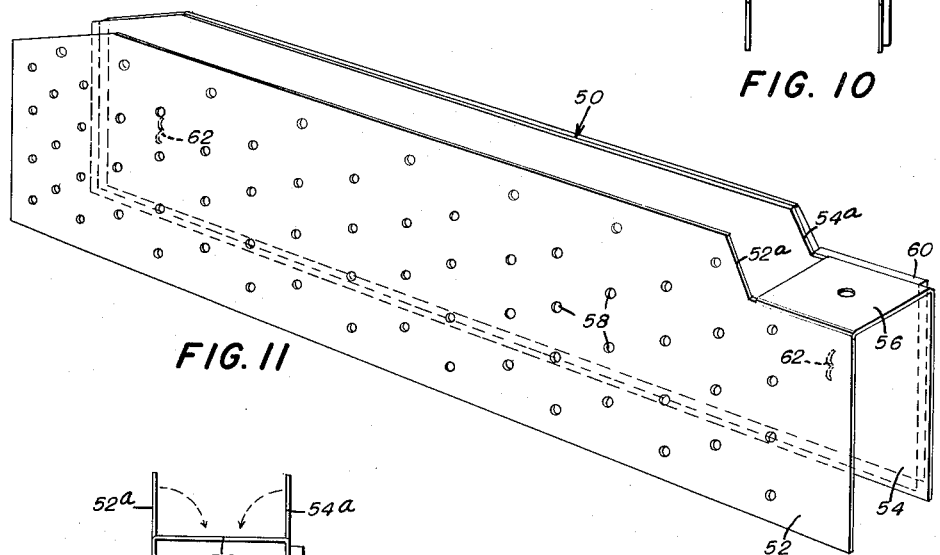
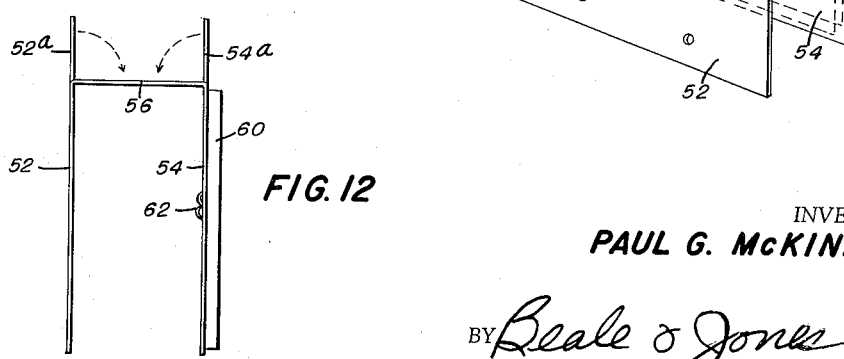
INVENTOR
PAUL G. McKINLEY
BY Beale & Jones
ATTORNEYS

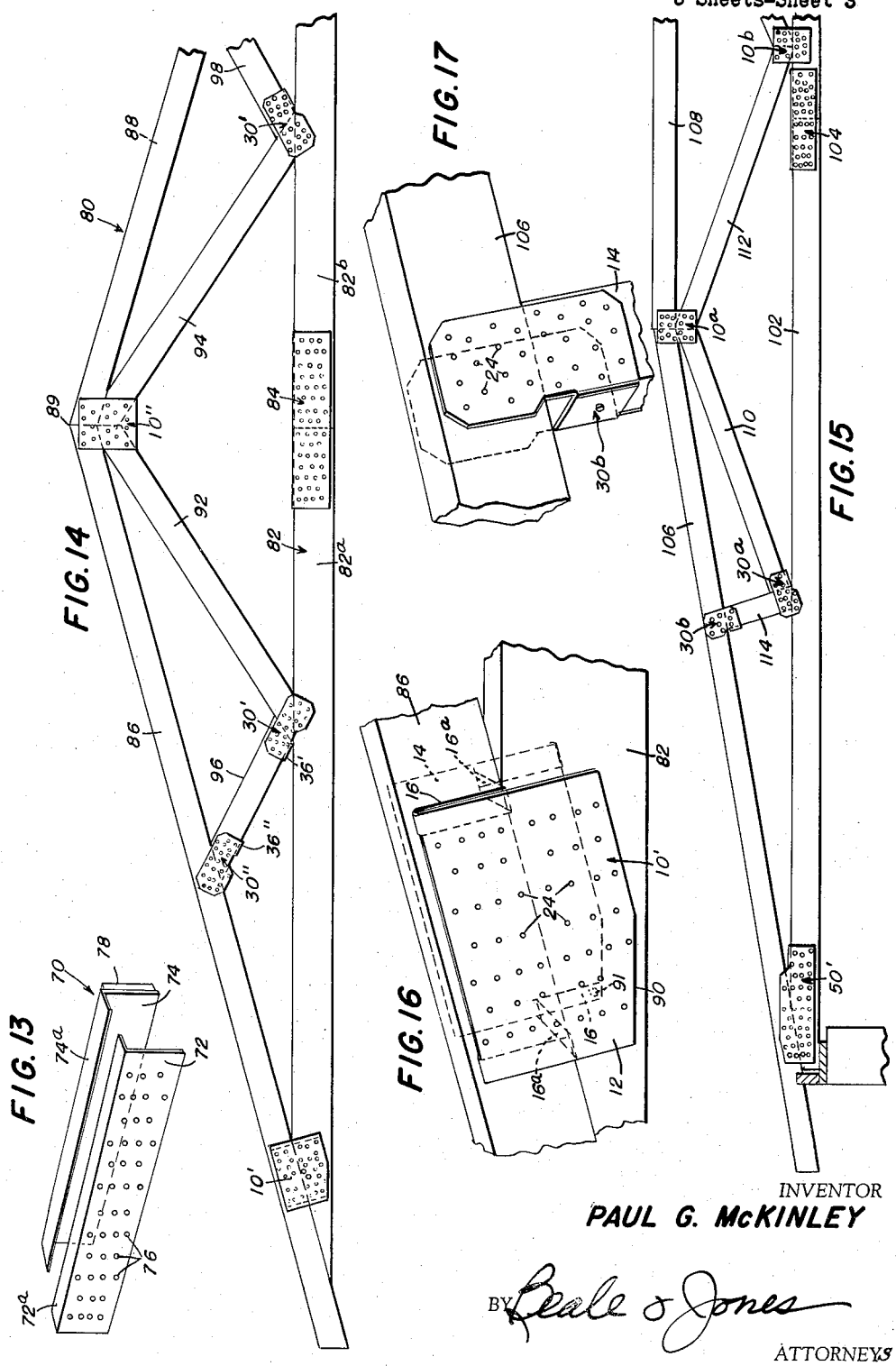

United States Patent Office 2,988,854
Patented June 20, 1961

2,988,854
WOODEN JOINT COUPLING INCLUDING NAIL CLINCHING MEANS
Paul G. McKinley, West Palm Beach, Fla., assignor to Pagebar, Inc., Miami, Fla., a corporation of Florida
Filed Apr. 7, 1958, Ser. No. 726,896
13 Claims. (Cl. 50—55)

This invention relates to a coupling for a joint in a wooden truss. More specifically, this invention relates to a coupling comprising a pair of parallel coextensive side plates held in laterally aligned spaced relation. One of the plates is apertured. The other carries a soft panel on one side. In use, the wooden structural members to be joined are placed between the parallel plates and nails or other fasteners are driven through the apertures in the first plate, through the structural members, through the second side plate and are clinched over in the soft panel.

In forming a wooden truss or the like, it has been customary to secure the various structural members including the chords and webs together by bolts or lag screws. Such connection has necessitated drilling of holes through the structural members after painstaking alignment, and has required much effort and highly skilled carpentry. Structures produced in this manner have not only been expensive but have usually been of the non-coplanar type wherein a web, for instance, will be connected to one of the chord members at the side thereof, effecting unnecessary twisting moments, awkwardness in handling, and poor esthetic qualities.

In the copending U.S. Patent 2,840,014, issued June 24, 1958, of which I am co-inventor, there is disclosed an H-shaped coupling and a truss made using said couplings. The couplings of the earlier application comprise a pair of parallel side plates joined by a central perpendicular web member. In use, the ends of the structural members desired to be joined are inserted between the side plates and are made to abut the opposite faces of the central web member and nails are driven from either side through the opposite plates into the wooden structural members to effect a secure joint.

While the coupling member of the earlier application and joints made using it represent a distinct advance over the old-fashioned method of forming a joint, and have been able to withstand the heavy test loads necessary to meet safety requirements, it has been found that a joint of even greater strength can be achieved by driving the nails through the first side plate, entirely through the structural member, piercing the second side plate and by clinching the protruding nail point on the outside of the coupling. By extending the nails all the way through and clinching them, the same effect is achieved as applying a rivet at the joint, for the head of the nail is on one side of the coupling and the clinched point is on the other side precluding the possibility of pulling the nail out of position as tension or compression is applied to the wooden structural members of the joint.

The accomplishment of this simple joint, including the clinched nail, not only produces a stronger coupling of the wooden structural member, but requires less time to effect. Using the novel means described in this application, all nails may be driven from one side of the structural member and clinched without turning the assembly over, thus saving a great deal of time and energy. Also despite the effecting of a stronger joint in less time, skill required to assemble the joint is no greater than that required to assemble the joint with the coupling of the earlier application mentioned above.

It is, therefore, an object of this invention to provide a coupling for use in joining wooden structural members to form a truss which is extremely simple to manufacture and to install.

It is a further object of this invention to provide a coupling which when used in a joint of two or more wooden structural members produces a union of great strength and rugged dependability.

It is still further object of this invention to provide a coupling for use in forming a coplanar joint of wooden structural members, said coupling having novel means for assisting the clinching of a nail fastener, said means covering the clinched nail point, precluding the possibility of injury to person or property that might be caused by contacting it and hiding its unsightly presence from view.

Figure 2:
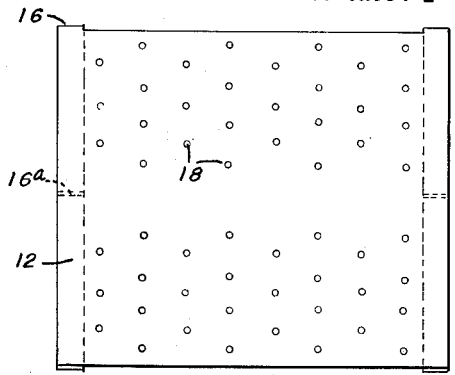
Figure 3:
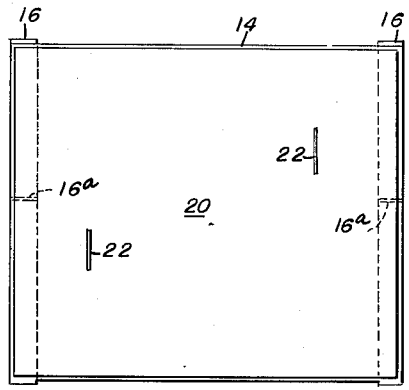
Figures 5, 6:
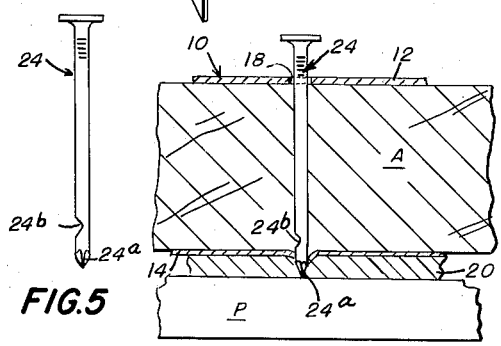
Figure 4:
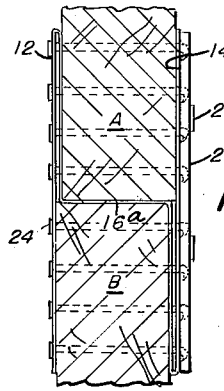
Figure 7:
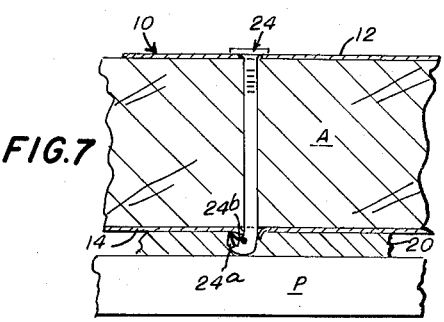

This invention embodies other novel features, details of construction and arrangement of parts which are hereinafter set forth in the specification and claims, and illustrated in the accompanying drawings, wherein:

FIG. 1 is a perspective view of a coupling of the invention taken slightly from above and from the front;
FIG. 2 is a front elevational view;
FIG. 3 is a rear elevational view;
FIG. 4 is a side elevational view showing the coupling in use;
FIG. 5 is a side view of a nail used in the coupling of the invention;
FIG. 6 is an enlarged fragmentary sectional view indicating a step in the assembly using the coupling of the invention;
FIG. 7 is an enlarged fragmentary sectional view showing a later step in the assembly using the coupling of the invention;
FIG. 8 is a perspective view of a modified embodiment of the invention;
FIG. 9 is a front view of the modified form of the invention shown in FIG. 8;
FIG. 10 is an end view of the modified form of the invention shown in FIG. 8;
FIG. 11 is a perspective view of a second modification of the invention;
FIG. 12 is a side view of a third modified form of my invention;
FIG. 13 is a perspective view of a fourth modification of the invention shown in perspective;
FIG. 14 is a fragmentary elevation of a peaked roof truss using the couplings of the invention;
FIG. 15 is a fragmentary elevation of a hip roof truss using the couplings of the invention;
FIG. 16 is an enlarged perspective view of the heel joint shown in the peaked roof truss of FIG. 14; and
FIG. 17 is an enlarged perspective view of a web-cord connection in a truss using a modified form of the coupling of the invention.

Briefly, this invention is a coupling for use in forming a roof truss. It comprises a pair of parallel side plates adapted to fit against opposite side surfaces of the structural members to be joined. One of the side plates is apertured to permit driving of nails therethrough. The opposite side plate has secured thereto on its outside surface a layer of composition board into which the nail point, after passing through the wooden structural member and the opposite side plate, may be clinched.

Referring more specifically to the drawings, an embodiment of the invention is generally designated 10 in FIG. 1. It is a coupling of H-shape and comprises a pair of side plates 12 and 14 substantially equal in dimension and disposed in spaced parallel relation. Integral with the side plates are a pair of laterally spaced connecting strips 16. The connecting strips join opposite ends respectively of the upper edge of the sideplate 12. At the joint they are immediately reversely bent and extend down against the inside surface of the plate 12 to about the centerline thereof. Here the strips turn and extend perpendicularly in central spacing runs 16a. Meeting the side plate 14, they turn and extend downward to the lower end of the coupling where they are reversely bent and immediately join the opposite ends respectively of the lower edge of the side plate 14.

To receive nails, the side plate 12 is formed with a plurality of apertures 18. Preferably, these apertures are formed in groups of a plurality of rows, one group on either side of the center line of the side plate. The holes in one row are in staggered relation to the holes in the adjacent rows on either side to avoid the close placement of nails in a straight line which might weaken the wooden structural member into which the nails are driven. The other side plate 14 is imperforate and is provided with a thickness of relatively soft sheet material 20 secured against the outside surface thereof. This thickness serves as a clinching board. In the preferred embodiments the securing of the clinching board 20 is effected by a pair of staggered heavy staples 22 (see FIGS. 1 and 3) each of which extends from the outside of the coupling 10 through the board 20 and the side plate 14 and is clinched on the inside surface thereof. Alternatively, a layer of cement or other adhesive between the board 20 and the side plate 14 can be used.

A joint using the embodiment of my invention above described is shown in FIG. 4. In a joint, the two wooden structural members A and B desired to be joined extend into the two opposed openings between the side plates, their ends abutting the opposite faces of the spacing runs 16a of the connecting strips. In making the joint, the assembly is laid flat with the clinching board 20 resting on a thick steel plate p (see FIG. 6). A nail 24 is then started through one of the apertures 18 in the side plate 12 and is driven through the wooden structural member A lying thereunder. Driven farther, it pierces the imperforate side plate 14 and extends through the clinching board 20 until its point 24a contacts the steel plate p.

The nails used with the invention are each formed with a notch 24b in the periphery spaced slightly upward from the point 24a (see FIG. 5). The nail may additionally be resin dipped to enhance its gripping qualities. The notch formed in the nail weakens it so that driving against the steel plate p will cause the point 24a to collapse in the direction of the notched side (see FIG. 7) and turn perpendicularly, or even slightly upward to clinch in the relatively soft clinch board 20. The nail 24 is additionally driven until its head is flat against the side plate. After the final blow, a nail of appropriate length will have its point buried in the clinching board 20 in an unyieldable anchoring, and the piercing end 24a, directed upwardly, will engage sideplate 14 (FIG. 7) and urge it up toward structural member A. The head of the nail will engage the opposite sideplate 12 about opening 18 and urge sideplate 12 down toward structural member A. Thus, the nail gives the effect of a double-headed rivet extending through the coupling 10.

Specifically describing the material of this and other embodiments of the invention, the H-shaped coupling is bent from flat galvanized steel sheet. A sheet of 20 gauge steel has been found satisfactory and grade C is adequate to withstand the reverse bending of the connecting strips without cracking or showing signs of weakness. For the clinching board 20 disposed on the outside of the side plate 14, a composition product of laminated wood fiber has been selected. A satisfactory board is currently sold under the registered trademark "Upson" board. While thickness of the "Upson" board may vary, it has been found that a thickness about one-third greater than the diameter of the nail used in the coupling gives about the best results. Thus, for instance, if an eight penny nail is used, a clinching board of a thickness of three-sixteenths inch produces best results.

A modification showing another embodiment of my invention is pictured in FIG. 8 and generally designated 30. This embodiment is of U-shape and comprises a pair of spaced parallel side plates 32 and 34 which are joined at their upper edges at one end by a connecting strip 36. The strip 36 is integral with the side plates. As in the first embodiment, the side plate 32 is formed with a plurality of apertures 38 arranged in staggered rows and the side plate 34 has a clinching board 40 coextensive therewith and secured to the outside surface thereof. In this embodiment the connecting strip has an aperture 36a for passage of a nail into a wooden structural member, and the portions of the side plates remote from the connecting strip 36 may have an upward enlargement 32a and 34a for more contact area with the wooden structural members. In this embodiment of the invention, the connecting strip 36 constitutes a saddle plate and is abutted on only one side by a wooden structural member in contrast to the central run 16a of the first embodiment which is abutted from both sides by a wooden structural member. In this second embodiment the joined structural members rest against each other in the area between the side plates (see FIGS. 14 and 15).

For effecting a strong joint of wooden structural members, the embodiment of the invention shown in FIG. 11 and designated 50 may be used. This embodiment is U-shape and is similar to the embodiment shown in FIG. 8 except it is of greater length. It comprises the side plates 52 and 54 connected at one end and held in spaced relation by a connecting strip 56 again forming a saddle plate. The side plate 54 has a clinching board 60 secured to the outside surface thereof by staples 62. In this embodiment the side plates both have upward enlargements 52a and 54a in their portions remote from the connecting strip 56 as in the second embodiment 30. As shown in FIG. 11, the clinching board 60 secured to the side plate 54 extends up coextensive with the upward enlargement 54a. In a slightly modified form of the invention shown in FIG. 12, and suitable for use splicing two co-linear structural members, the clinching board is of rectangular shape, having the height of the side plates at the connecting strips 56. The use of the enlarged areas of the side plate to effect a long splice is suggested in FIG. 12 wherein the enlarged portions 52a and 54a may be bent down over the wooden structural members as indicated by the arrows. In bending down these enlarged areas 52a and 54a some additional strength is given to the splice.

Another use of the embodiment of the invention shown in FIG. 11 is found at 50' in FIG. 15 forming a heel joint in a wooden truss. While the H-shaped embodiment of the coupling shown in FIG. 1 may be used to form the heel joint (see FIG. 14), the coupling 50 may be used alternatively. When the embodiment shown in FIG. 11 is used in such a heel joint, the enlarged portions 52a and 54a are allowed to remain upstanding and they extend along the sides of the upper chord 106 of the truss (see FIG. 15). To form a heel joint in this manner, if it is necessary, a portion of the side plates away from the connecting strip 56 may be cropped off. Removal of this excess material, if the occasion demands, will preclude interference with roof planking members, truss heel support members, etc.

A further embodiment of my invention is designated 70 in FIG. 13. This embodiment includes side plates 72 and 74 which are bent perpendicularly inward at the upper edges 72a and 74a thereof, and are not connected. As indicated, the vertical portion of the side plate 72 may have apertures 76 in staggered rows and the opposite side plate has the clinching board 78 secured to the outside thereof. Modification 70 is useful in forming a long splice, wherein the vertical inside surfaces of the side plates 72 and 74 contact the sides of the jointed structural members and the inwardly directed upper portions 72a and 74a of the side plates overlie the tops of the joint structural members. Portions 72a and 74a are thus helpful in positioning the side plates. An advantage of the embodiment 70 is that it may accommodate structural members of different thicknesses as the side plates are not held in fixed spaced relation by a connecting strip.

The various embodiments of the coupling of the invention having been disclosed, their use in forming joints in a roof truss is illustrated in FIGS. 14 through 17. In all of these figures only the perforated side plates of the couplings are shown: the clinching boards, on the opposite side plates are not shown. In FIG. 14, the peaked roof truss is generally designated 80. It comprises a lower chord member 82 including two wooden structural members 82a and 82b joined by a long splice 84 which may be either the embodiment of the invention shown in FIGS. 12 or 13. The opposite ends of the lower chord member 82 are beveled off to present surfaces parallel to the undersurface of a pair of upper chords 86 and 88 which are attached at the opposite ends of the lower chord member 82 and extend upwardly and inwardly to meet in a peak 89. At the joint of the lower chord and the upper chords, the embodiment of the invention shown in FIG. 1 is used (see FIG. 16) and is designated 10'. Herein, the side plates lie against opposite sides of the wooden structural members. The spacing run 16a of the connecting strips is sandwiched between the two jointed structural members, contacting both the beveled end face of the lower chord member 82 and the undersurface of the joined upper chord member 86. The lower corner of each side plate may be cropped off as at 90 to avoid a protruding point. If such cropping is accomplished, the connecting strip 16 may be secured to the lower corner of the side plate 14 by spot welding 91. As shown, nails 24 extend through the structural members and are clinched in the clinching board 20 on the outside of the side plate 14.

In the joint at the peak 89 the embodiment of the invention shown in FIG. 1 is turned sideways and used with the connecting strips 16a disposed one above the other and at least one connecting strip 16a extending between the upper chord members 86 and 88. The H-shaped coupling 10" at the peak 89 also joins the upper ends of web members 92 and 94. The web members 92 and 94 extend outwardly and downwardly and have their lower ends beveled off and are secured to the lower chord member 82 by couplings of the embodiment shown in FIG. 8 and designated 30'. These couplings also connect secondary web members 96 and 98 to the lower chord 82. As shown, the connecting strip 36' of these couplings abut the undersurface or upper surface of the secondary chord 96 and the side plates lie against either side of the wooden structural members. Here again, nails are driven through the coupling 30' and are clinched in the board on the opposite side (not shown) thereof. The joints between the upper chords 86 and the secondary web members 96 are accompanied by the coupling of the embodiment shown in FIG. 8 and are designated 30". The connecting strip 36" abuts the undersurface or upper surface of the secondary web member 96.

In forming a hip roof truss 100, the couplings of the invention may be used as shown in FIG. 15. Here, the lower chord member 102 may comprise a pair of colinear wooden structural beams 102a and 102b joined by a long splice 104 of the type shown in FIGS. 12 or 13. The inclined upper chord members 106 (only one of which is shown) are joined at the opposite ends of the lower chord member 102 by the H-shaped coupling shown in FIG. 1, or by the long U-shaped coupling of FIG. 11, here designated 50'. The inclined upper chord members 106 are attached to the horizontally disposed upper chord member 108 by the H-shaped coupling of FIG. 1, here designated 10a. At this joint web members 110 and 112 are secured at a common joint and extend downwardly in either direction. Member 112 is jointed by an H-shaped coupling 10b to the midpoint of the lower chord 102. Member 110 is jointed at its lower end by a U-shaped brace 30a to a web member 114 and to the lower chord member 102. The web member 114 extends upwardly and is connected by a U-shaped coupling 30b to the inclined upper chord member 106.

The versatility of the couplings of my invention will be apparent from inspection of FIGS. 14 and 15. It can readily be seen that the couplings of the invention, including the clinching board simplify the production of a rugged truss. Those familiar with the art will acknowledge that the couplings of my invention now make possible the mass production of desirable coplanar truss members by a series of simple cutting and fitting operations. The strength of a truss thus produced favorably compares with trusses made by the old-fashioned time-consuming assembly processes requiring great effort by highly skilled carpenters.

While this invention has been shown in but few forms, it is obvious to those skilled in the art that it is not so limited but is susceptible of various changes and modifications without departing from the spirit and scope of the claimed invention.

I claim:

1. A joint comprising in combination: a coupling member including a pair of spaced, parallel aligned sheet metal sideplates connected by at least one connecting strip, and a thin clinchboard secured to one sideplate in covering relation flat against the outside face thereof; at least two structural elements at least one of which has a portion fitting between said sideplates; at least one headed fastener extending through the uncovered sideplate, through said portion, through the covered sideplate in piercing engagement, and being clinched over in the clinchboard, the piercing end of said headed fastener engaging the outside face of said covered sideplate, the head and piercing end of said headed fastener urging said sideplates respectively toward the said portion; and means securing the other structural element to said coupling member.

2. A joint comprising in combination: a coupling member including a pair of spaced, parallel aligned sheet metal sideplates and a thin clinchboard secured to one sideplate in covering relation flat against the outside face thereof; at least two structural elements having portions fitting between said sideplates; at least one headed fastener extending through the uncovered sideplate, through one of said portions, through the covered sideplate in piercing engagement, and being clinched over in the clinchboard, the piercing end of said headed fastener engaging the outside face of said covered sideplate, the head and piercing end of said headed fastener urging said sideplates respectively toward the said one of said portions; and means securing the portion of the othe structural element between said sideplates.

3. A joint as described in claim 2 wherein said headed fastener is notched adjacent its point.

4. A joint as described in claim 2 wherein said clinchboard is of thickness one-third greater than the diameter of the headed fastener.

5. A joint as described in claim 2 wherein the clinchboard comprises a sheet of laminated wood fiber.

6. A joint as described in claim 2 wherein said clinchboard is substantially coextensive with the sideplate to which it is secured.

7. A joint as described in claim 2 wherein staple means secure said clinchboard to the said one sideplate.

8. A joint as described in claim 2 wherein the sideplates are connected by at least one connecting strip.

9. A joint as described in claim 2 wherein the means securing the portion of the other structural element between the sideplates comprises a second headed fastener extending through the uncovered sideplate, through the portion of the other structural element, through the covered sideplate in piercing engagement, and being clinched over in the clinchboard.

10. A wooden truss for supporting a roof, said truss having coplanar structural elements comprising a lower chord member and a plurality of upper chord members, said chord members being joined together respectively at joints to outline a polygon, each of said chord members forming a side of said outlined polygon, at least one of said joints comprising a coupling member including a pair of parallel aligned sheet metal sideplates disposed on opposite faces of said truss respectively and superposing adjacent portions of at least two structural elements, a thin clinchboard secured to one sideplate in covering relation flat against the outside face thereof; at least one headed fastener extending through the uncovered sideplate, through one of said portions, through the covered sideplate in piercing engagement, and being clinched over in the clinchboard, the piercing end of said headed fastener engaging the outside face of said covered sideplate, the head and piercing end of said headed fastener urging said sideplates respectively toward the said one of said portions; and means securing the portion of said other structural element between said sideplates.

11. A wooden truss as described in claim 10 wherein said sideplates are connected by at least one connecting strip.

12. A wooden truss as described in claim 11 wherein said one joint is a heel joint and said connecting strip rides on the top surface of said lower chord member.

13. A wooden truss as described in claim 11 wherein said coupling is of H-shape and said structural elements comprising the joint engage opposite sides of the connecting strip.

References Cited in the file of this patent

UNITED STATES PATENTS

| | | |
|---|---|---|
| 1,675,226 | Munroe | June 26, 1928 |
| 1,842,796 | Morgan | Jan. 26, 1932 |
| 1,903,700 | Kruse | Apr. 11, 1933 |
| 2,002,506 | Loudenback | May 28, 1935 |
| 2,056,667 | Gouge | Oct. 6, 1936 |
| 2,065,256 | Wilson | Dec. 22, 1936 |
| 2,111,634 | Kotrbaty | Mar. 22, 1938 |
| 2,347,879 | Brunton | May 2, 1944 |
| 2,376,936 | Pfeffer | May 29, 1945 |
| 2,477,163 | Barnett | July 26, 1949 |
| 2,642,825 | McElhone | June 23, 1953 |
| 2,646,285 | Snyder | July 21, 1953 |
| 2,700,457 | Munroe | Jan. 25, 1955 |
| 2,764,108 | Findleton | Sept. 25, 1956 |
| 2,770,846 | Findleton | Nov. 20, 1956 |
| 2,827,676 | Sanford | Mar. 25, 1958 |
| 2,840,014 | Wadsworth et al. | June 24, 1958 |
| 2,911,690 | Sanford | Nov. 10, 1959 |

FOREIGN PATENTS

| | | |
|---|---|---|
| 1,988 | Great Britain | 1863 |
| 137,721 | Sweden | 1952 |